March 17, 1936.                R. MECHAU                 2,034,110
                              LINEAR GUIDE
                          Filed Sept. 22, 1932
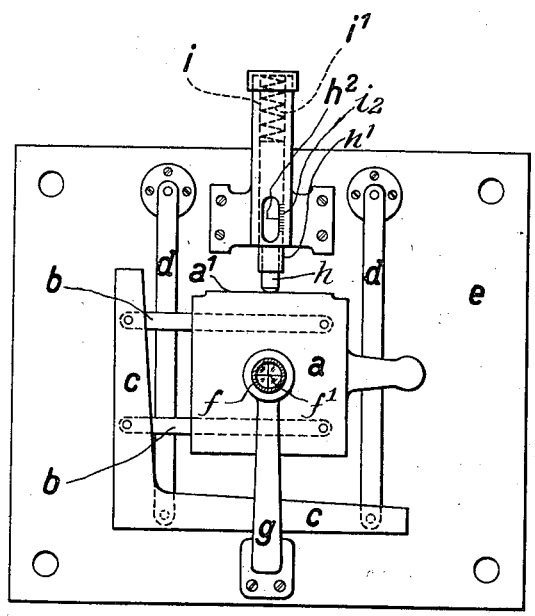
Inventor:
Robert Mechau Patented Mar. 17, 1936

2,034,110

UNITED STATES PATENT OFFICE 2,034,110

LINEAR GUIDE

Robert Mechau, Jena, Germany, assignor to Carl Zeiss, Jena, Germany

Application September 22, 1932, Serial No. 634,340
In Germany September 26, 1931

2 Claims. (Cl. 308—3)

This application has been filed in Germany September 26, 1931.

Linear guides for fine-mechanical apparatus, for instance tube guides for microscopes and guides of fine-measuring devices, which frequently are required to repeatedly adjust or measure minutely very small objects of thousandths of millimeters and even less, must be so constructed that the parts to be moved may slide easily and uniformly and that, above all, the wear of all guiding parts moving relatively to each other be reduced to a minimum. To achieve this, use has been made of a lubricant, generally grease, between the parts sliding upon each other, or the friction has been reduced by making the two guide parts of different metals. Also it has been tried to reduce the friction and the wear of the guide surfaces by applying rolling members, that is to say rolls or balls. All these means not proving to be very satisfactory, the suggestion has been made to add to the guides auxiliary guides that have to perform the greater part of the guiding work, and to use the guides proper, which influence the result, only for the final fine adjustment. In order to achieve this, the auxiliary guides are required to be given a position in which they are out of use temporarily, the result being a comparatively unpractical construction.

Tests have proved that according to the invention the problem may be solved in an astonishingly simple and most satisfactory way by making one of the two guide parts, either the guiding or the guided part, of solid graphite. Not only is there attained in this manner an easy and uniform sliding of the guide but the wear of the two guide parts is reduced to such an extent that it may be neglected completely even after a long spell of use, a further advantage being that any lubricant may be dispensed with. Also it has been found that there is a special advantage in making the guide part cooperating with the graphite part of cast-iron.

The accompanying drawing illustrates in a plan view a constructional example of a guide according to the invention.

In this constructional example, which represents a device of the kind as is used for instance for measuring photographs, a cast-iron plate $a$ for carrying photographs is fixed by means of two links $b$ to a square $c$ which, in turn, is attached to two links $d$ on a stage $e$. Above the plate $a$ is disposed a microscope $f$ having cross wires $f^1$, this microscope being rigidly connected by an arm $g$ to the stage $e$. By means of the links $b$ and $d$, any point of the plate $a$ may be covered by the cross wires $f^1$. With a view to measure the distances of the different points of the plate from a line of reference parallel to the upper plate edge $a^1$, this edge $a^1$ is constructed as a ruler representing the guide for a caliper pin $h$ which, according to the invention, is of graphite only. The caliper pin $h$ is disposed in a sleeve $h^1$ displaceable in a bore $i$. By means of a spring $i'$, the caliper pin $h$ is permanently pressed against the ruler $a^1$. The sleeve $h^1$ has an index $h^2$ which indicates the position of the sleeve relative to a scale $i^2$, this position being observed for instance by means of a magnifier.

When the plate $a$ is adjusted, the ruler $a^1$ is caused to slide continuously along the point of the caliper pin $h$. No lubricant being used, the idea may suggest itself that there is to be feared a wear of the ruler edge and the caliper pin and, as a consequence, a faulty measurement. It has proved however that the construction according to the invention makes the wear so exceedingly small that it is negligible.

I claim:

1. In an optical measuring instrument, for instance a microscope or the like, a parallel motion device comprising a guiding part and a guided part, the one of these parts being a body of graphite, and a holder for this body.

2. In an optical measuring instrument, for instance a microscope or the like, a parallel motion device comprising a guiding part and a guided part, the one of these parts being a body of graphite, and the other of these parts being of cast-iron.

ROBERT MECHAU.